(12) United States Patent
Kaeser et al.

(10) Patent No.: US 10,039,411 B2
(45) Date of Patent: Aug. 7, 2018

(54) DEVICE FOR PREPARING A BEVERAGE FROM A CAPSULE WITH A CLOSURE SYSTEM INVOLVING TWO CLOSURE STAGES

(71) Applicant: NESTEC S.A., Vevey (CH)

(72) Inventors: Stefan Kaeser, Aarau (CH); Rudolf Schenk, Konolfingen (CH)

(73) Assignee: Nestec S.A., Vevey (CH)

( * ) Notice: Subject to any disclaimer, the term of this patent is extended or adjusted under 35 U.S.C. 154(b) by 325 days.

(21) Appl. No.: 14/646,620

(22) PCT Filed: Nov. 25, 2013

(86) PCT No.: PCT/EP2013/074527
§ 371 (c)(1),
(2) Date: May 21, 2015

(87) PCT Pub. No.: WO2014/082940
PCT Pub. Date: Jun. 5, 2014

(65) Prior Publication Data
US 2015/0289707 A1    Oct. 15, 2015

(30) Foreign Application Priority Data

Nov. 29, 2012  (EP) .................................... 12194801

(51) Int. Cl.
*A47J 31/06* (2006.01)
*A47J 31/057* (2006.01)
(Continued)

(52) U.S. Cl.
CPC ............. *A47J 31/407* (2013.01); *A47J 31/22* (2013.01); *A47J 31/3685* (2013.01)

(58) Field of Classification Search
CPC ...... A47J 31/22; A47J 31/407; A47J 31/3685; A47J 31/4403; A47J 31/4421;
(Continued)

(56) References Cited

U.S. PATENT DOCUMENTS 3,812,773 A * 5/1974 Hultsch .................. A47J 31/42
99/290
7,730,829 B2 * 6/2010 Hammad ............ A47J 31/0684
99/295

(Continued)

FOREIGN PATENT DOCUMENTS

| WO | 2006127118 | 11/2006 |
|----|------------|---------|
| WO | 2011092301 | 8/2011  |
| WO | 2012041605 | 4/2012  |

*Primary Examiner* — Tu B Hoang
*Assistant Examiner* — Alba Rosario-Aponte
(74) *Attorney, Agent, or Firm* — K&L Gates LLP

(57) ABSTRACT

Beverage device (1) comprising an upper sub-assembly (2) comprising a brewing interface head (4) and a lower sub-assembly (3) comprising a capsule receiver (5) for being engaged by the brewing interface head (4) between a capsule handling position and a closure head position, wherein the upper sub-assembly (2) is hinged on the lower sub-assembly (3) to be pivotally movable between said two positions and the brewing interface head (4) comprises a frame (7) and a brewing interface member (8); said interface member (8) being arranged to be movable relative to the frame (7) between a disengaging-to-capsule position and an engaging-to-capsule position, wherein it further comprises latch means (9), associated to the brewing interface head (4) and the capsule receiver (5), which are arranged for latching the brewing interface head (4) to the receiver (5) in the closure head position. The device can also be designed for centrifugal beverage extraction with an improved control of the alignment of the rotational parts of the brewing head with the capsule receiver.

17 Claims, 12 Drawing Sheets

(51) Int. Cl.
*A47J 31/40* (2006.01)
*A47J 31/22* (2006.01)
*A47J 31/36* (2006.01)

(58) Field of Classification Search
CPC .... A47J 31/4485; A47J 31/44; A47J 31/3619;
A47J 31/3638; B65D 85/8043
USPC ..... 99/295, 300, 302 C, 279, 280, 285, 287,
99/306, 307; 426/77, 115, 433
See application file for complete search history.

(56) References Cited

U.S. PATENT DOCUMENTS

2008/0000357 A1   1/2008  Yang et al.
2010/0178404 A1*  7/2010  Yoakim .................. A47J 31/22
                                                          426/431
2012/0301581 A1* 11/2012  Abegglen .......... B65D 85/8043
                                                          426/112

* cited by examiner

DEVICE FOR PREPARING A BEVERAGE FROM A CAPSULE WITH A CLOSURE SYSTEM INVOLVING TWO CLOSURE STAGES

CROSS REFERENCE TO RELATED APPLICATIONS

The present application is a National Stage of International Application No. PCT/EP2013/074527, filed on Nov. 25, 2013, which claims priority to European Patent Application No. 12194801.2, filed on Nov. 29, 2012, the entire contents of which are being incorporated herein by reference.

FIELD OF THE INVENTION

The present invention relates to a device for the preparation of a beverage from a capsule containing beverage ingredients in a brewing unit. More particularly, the device has a closure system in two stages for allowing an improved closure precision of the brewing unit around the capsule.

BACKGROUND

The preparation of a beverage by a capsule containing beverage ingredients is known. In general, the capsule is inserted in a beverage production device, such as a coffee machine, liquid is fed in the capsule and a beverage is extracted from the capsule under pressure or by gravity.

The term "capsule" refers to any flexible, rigid or semi-rigid container containing beverage ingredients. Other synonymous to a capsule are: "pod", "pad", "cartridge" or "sachet". The capsule can be single use. The container can also be filled with ingredients by the user to form the capsule just before use.

The term "ingredients" means any suitable beverage substance such as ground coffee, soluble coffee, leaf tea, soluble tea, herbal tea, dairy powder, culinary powder, baby food and combination thereof.

The term "beverage device" means a device for preparing a beverage by means of a capsule.

In general, the capsule is inserted in an open brewing unit of the device. For example, in EP1090574, the device comprises a jaw mechanism with a lower part for receiving the capsule and an upper part for closing on the lower part. The lower and upper parts are mounted around a fixed pivot which is sufficiently distant from the two parts so that a sufficient large opening is provided, upon the upper part pivoting around the lower part, to enable a capsule to be placed between the two parts in the open position. The closure is obtained by a lever pivotally mounted on the upper part and associated to a knee joint mechanism with the lower part. The stable closure of the two parts around the capsule is obtained by actuating the lever and the knee joint mechanism until a stable closed position of the knee joint is reached. A problem is that such closure is not precise enough due to the long distance between the fixed pivot point and the closure area. This results in a risk of misalignment between the upper part and the lower part; such risk increasing as the device starts aging and its pieces wearing.

In patent EP1906797B1, the beverage device comprises a lid mount with a rotating lock plate with cams which slide in a recessed of the lid mount to latch the lid mount to a head bottom. The lock plate is moved by a gear mechanism driven by a lever attached to the lid mount. Such mechanism also lacks precision in the axial direction of closure since the lock plate moves along the transversal direction from unlatch to latch positions. In addition, such device is not adapted to perforate the capsule for providing liquid inlet(s) and/or beverage outlet(s). A similar system is described in patent EP1551263.

Patent EP1937117B1 relates to an espresso coffee machine comprising a filter holder means for holding a capsule comprising a closing flap hinged at one end with the supply unit of the machine and comprising a releasable engaging means at its opposite end suitable for engagement with engaging means provided on the wall of the body and a capsule hook-type ejector which cooperates with the edge of the capsule to eject it upon separation of the filter holder means from the supply unit. Again, such device lacks precision in closure of the closing flap onto the supply unit. The closure stress is essentially born by the hinge which will affect the reliability overtime. Furthermore, a high manual force is needed to close the device. Such device is therefore not adapted for perforating liquid inlet(s) and/or beverage outlet(s) through the capsule.

EP1209997B1 relates to a beverage machine comprising a brewing head which has an upper part pivotally mounted to a lower part; the upper part being latched to the lower part by a front latch and the upper part comprising a rotably mounted inner cover for self-adjusting axially to the filter holder in the lower part. This mechanism is typically intended for receiving filter pods for which the precision of the closure is not critical and for which the closure forces are relatively weak.

EP2210539 relates to a device and system for preparing a beverage using brewing centrifugal force. The device comprises a capsule holder assembly with a holder having a trunconical housing in which the capsule is inserted. The holder is mounted along an axis of rotation I by a ball bearing. An injection lid assembly is provided with an internal lid which can be mounted on a fixed support part of the lid assembly in a pivotable manner along the axis I when the device is closed. A problem lies in that due to the pivotable mounting of the injection lid on the fixed support part, a misalignment of the rotational axis of the lid with the rotational axis of the holder may occur; especially, when the pivot is submitted to repeated closure cycles and endures high stresses.

Therefore, there is a need for a beverage device which provides a better precision of the closure between the parts encasing the capsule. There is also a need for providing a more robust system, in particular, with lower stresses applied on the distanced pivot means. There is also a need for a more secured closure with potentially higher closure forces. There is also a need for an easy and convenient closure. In particular, there is also a need for an efficient closure system for a device more particularly designed for centrifugal beverage extraction using rotational brewing parts with a shortened and controlled tolerance chain and an improved alignment of these rotational brewing parts during and after closure.

The present invention provides a beverage device that responds to one or more of these needs.

SUMMARY OF THE INVENTION

The invention relates to a beverage device comprising an upper sub-assembly comprising a brewing interface head and a lower sub-assembly comprising a capsule receiver for being engaged by the brewing interface head between a capsule handling position and closure head position.

The upper sub-assembly is hinged on the lower sub-assembly to be pivotally movable between said two positions and the brewing interface head comprises a frame and a brewing interface member; said interface member being arranged to be movable relative to the frame between a disengaging-to-capsule position and an engaging-to-capsule position.

The device further comprises latch means, associated to the brewing interface head and the capsule receiver. The latch means are arranged for latching the brewing interface head to the capsule receiver in the closure head position.

The device further comprises displacement means in the brewing interface head for moving the brewing interface member between the disengaging-to-capsule and engaging-to-capsule positions.

The latch means and displacement means are preferably arranged to enable the brewing interface head to be latched to the receiver in the closure head position while the interface member is arranged in the disengaging-to-capsule position; and to enable the displacement means to move the brewing interface member from the disengaging-to-capsule position to the engaging-to-capsule position when the brewing interface head is latched in the closure head position.

In other words but without additionally limiting the invention as defined above, the device of the invention provides a two-stage closure principle allowing to firstly, secure the closure of the brewing head and, secondly engage the brewing interface member itself with the capsule receiver causing the said member to engage against the capsule in stable engaging position.

The configuration of the invention provides many advantages. The engagement of the brewing interface member on or against the capsule becomes independent from the closure of the head which can be considered as a "pre-closure" of the device. As a result, the chain of tolerance is shortened for ensuring a more precise alignment between the brewing parts. An also much lower stress is transmitted to the pivot of the sub-assemblies. In return, it becomes possible to apply a higher closure force on the brewing parts, especially on the brewing head member and capsule holder. Such configuration also becomes particularly beneficial for a centrifugal brewing device where such parts are rotating because a good alignment between the upper and lower rotating parts is critical. A proper alignment also enables to create a sufficiently robust device while avoiding to oversize the different elements of the device.

The term "capsule handing position" refers to a position of the brewing interface head enabling the capsule to be loaded in the capsule receiver and, possibly, the capsule to be also ejected from the capsule receiver. In particular, such position requires the brewing head to be displaced sufficiently away from the capsule receiver so that a capsule, which can be relatively large, can be easily inserted in the receiver.

The term "closure head position" refers to a stable closure position of the brewing head relative to the capsule receiver in which the capsule is inserted in the capsule receiver.

The term "engaging-to-capsule position" refers to a position of the brewing interface member in which the device becomes operational for feeding liquid in the capsule and/or extracting beverage from the capsule. The position is generally a position in which the brewing interface member is engaged with the capsule receiver and/or the capsule itself when the capsule is lodged in the receiver.

The term "disengaging-to-capsule position" refers to a position of the brewing interface member of the head in which the device is not yet operational for feeding liquid in the capsule and/or extracting beverage from the capsule. The position is generally a position in which the brewing interface member is away from the capsule receiver and/or the capsule itself when the capsule is lodged in the receiver.

In another aspect of the invention, the brewing interface member is mounted in the frame of the brewing interface head to be moved from its disengaging-to-capsule position to its engaging-to-capsule position in an essentially linear axial direction relative to the capsule receiver. More preferably, the brewing interface member is further mounted in the frame to be moved linearly without forced rotation about the axial direction between the two positions. Therefore, the brewing interface member can engage with the capsule without misalignment and without excessive stress on the capsule that could damage it. In particular, when the brewing interface head is provided with perforating elements, the perforations in the capsule can be better controlled and the tearing of the top wall (e.g., a lid membrane) of the capsule is reduced.

In an aspect of the invention, the displacement means comprises a rotating lever system acting on a force transfer member helically guided in the frame of the head; said force transfer member transferring the rotational torque of the lever system into a linear force pressing onto the brewing interface member. Therefore, it is possible to apply high force de-multiplication on the brewing interface member by a relatively long angular displacement of the lever system providing a short linear displacement of the brewing interface member. For example, the lever system may be displaced of 30 to 90 degrees thereby transforming into a short linear displacement of a few millimeters via the helically guided force transfer member. Such force de-multiplication is totally independent from the closure pivoting movement of the head on the capsule receiver. Therefore, the pivot axles of the device are relatively free of the closure stress created by this high pressure closure.

In another aspect of the invention, the rotating lever system comprises a manual pivotable handle rotationally positioned on the top of the brewing interface head along an axis, preferably corresponding to the axis of the central axis of the capsule receiver. The axis is preferably vertical or close to vertical when the brewing interface head is in closed position. The handle provides an easier and more convenient operation for closing the device, as well as releasing the head as will be later explained. The position of the handle also provides a more compact device.

In another aspect of the invention, the rotating lever system further comprises a torque transmitter axially and rotationally mounted between the pivotable handle and the helically guided force transfer member; said torque transmitter comprising at least one engagement wing positioned at a distance from the rotational axis of the transmitter for driving the force transfer member along its helical guiding path as a result of a determined rotational magnitude of the handle. Such torque transmitter is thus designed to increase the force submitted to the force transferring member or proportionally diminish the manual force required for leveraging the handle from the disengaging-to-capsule position to the engaging-to-capsule position.

According to another aspect of the invention, the brewing interface member comprises a central liquid inlet and a plurality of perforating members intended for perforating liquid outlets through the capsule as the brewing interface member is moved to the engaging-to-capsule position. In particular, the device is arranged to provide a beverage extraction by feeding liquid and extracting beverage from the same side of the capsule. This has the advantage that an efficient centrifugal extraction can be obtained with a relatively simple capsule design. Furthermore, a simpler brewing interface (and the closure means associated thereto) can be designed which encompasses both the liquid inlet and the beverage outlet means.

In another aspect of the invention, the latch means are arranged for latching the brewing head onto the capsule receiver in the closure head position by a manual force applied onto the upper sub-assembly against the lower sub-assembly without requiring an actuation member. In particular, the latch means is a bayonet-type means.

In a preferred example, the latch means comprises, on the brewing interface head, a first tubular member which is arranged in the brewing interface head to latch with a complementary second tubular member of the capsule receiver; said first tubular member being urged by a cam portion of the capsule receiver in the closure head position under the force of resilient biasing means. The first tubular member comprises, for instance, a series of recesses and protruding portions for mating in rotationally fashion with complementary protruding portions, e.g., tabs, of the second tubular member. The cam portion of the capsule receiver engages with the tubular member to force it in rotation against the force of resilient means such as one or more springs until the protruding portions (e.g., tabs) of the second tubular member engages with the recesses of the first tubular member. After engagement of the first and second tubular members, the first tubular member is urged in the return position by effect of the resilient means. Such configuration provides a reliable locking of the brewing head on the capsule receiver.

As mentioned, the lever system comprises a pivotable handle axially positioned on the top of the brewing interface head. The lever system is preferably arranged to configure the pivotable handle to act on the displacement means from a neutral position to a first angular position and to act on the latch means to release the brewing interface head which returns in the capsule handling position, from said neutral position to a second angular position of the handle. More preferably, the first and second angular positions are located in opposed rotational directions relative to the neutral position. A single handle is sufficient for operating the device thereby offering a user friendly and easy way of manipulating the handle to close and re-open the device.

The device further comprises a security locking system for blocking the displacement means as long as the brewing interface head is not latched by the latch means in the closure head position.

The device of the invention further comprises a housing for holding the capsule arranged in the capsule receiver to be rotationally driven along its central axis and the brewing interface member is mounted in free rotation in the brewing interface head in a manner to become aligned with the central axis of the housing in the engaging-to-capsule position of the brewing interface member onto the housing.

In particular, the displacement means are arranged relative to the capsule receiver to force the brewing interface member, moving from the disengaging-to-capsule position to the engaging-to-capsule position, to move transversally to a rotational axis of the brewing interface member which is aligned with the central axis of the housing. Preferably, the force transfer member of the displacement means is designed to engage with the capsule receiver to ensure an alignment of the force transfer member and, consequently, an alignment of the brewing interface member with the capsule receiver, and more particularly, with the rotational axis of its housing. For example, the force transfer member is mounted with a determined transversal gap in the brewing interface head and is shaped and dimensioned for engaging with a tubular member of the capsule receiver so that the force transfer member is forced to move transversally within such gap for aligning with the capsule receiver, when moving into the engaging-to-capsule position. A proper alignment of the rotational axis of the rotational parts of the centrifugal device is so always guaranteed.

The invention will be further described in relation to the figures in annex.

DETAILED DESCRIPTION OF THE DRAWINGS

Figure 1:
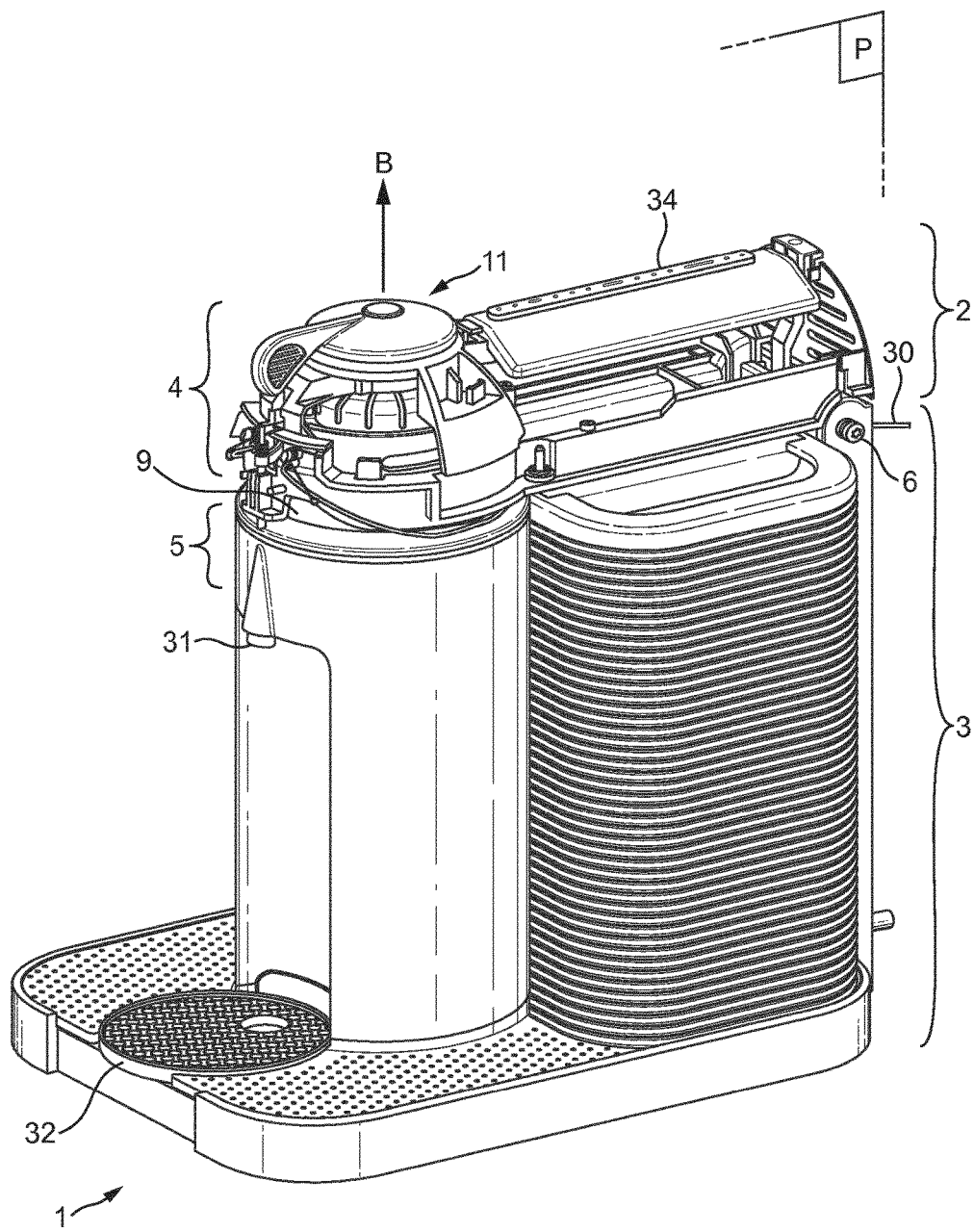
FIG. 1 shows a beverage device of the invention in perspective when the brewing interface head is closed and the handle is in neutral position corresponding to the disengaging-to-capsule position of the brewing interface member in the head.

As generally illustrated in FIG. 1, the present invention relates to a beverage device 1 such as a table top centrifugal coffee machine. The beverage device comprises an upper sub-assembly 2 and a lower sub-assembly 3. The upper sub-assembly comprises a brewing interface head 4 and the lower sub-assembly comprises a capsule receiver 5. The capsule receiver 5 is arranged for being engaged by the brewing interface head 4 between a capsule handling position and closure head position. In FIG. 1, the device is shown in a closure head position. In the following FIGS. 2 and 3, the device is shown in the capsule handling position.

In the capsule handling position, the capsule can be loaded in the capsule receiver 5 and, possibly, the capsule can also be ejected from the capsule receiver thanks to ejection means 28. Since it is not the core of the present invention, the ejection system including these means will not be described in detail in the present application for reasons of simplification. The ejection system is described in detail in co-pending patent application WO 2012/041605. The capsule could also be removed manually and such ejection system is so not mandatory.

The capsule handling position requires the brewing interface head 4 to be positioned sufficiently away from the capsule receiver 5 so that a capsule can be easily inserted in the receiver. For this, the upper sub-assembly 2 is hinged on the lower sub-assembly 3 to be pivotally movable between the two aforementioned positions. In particular, the upper sub-assembly comprises an arm 29 extending rearwards from the brewing interface head 4. The upper sub-assembly is mounted with a pivot 6 to the rear part of the lower sub-assembly 3. The detail of the pivot 6 can be viewed in FIG. 3 as a matter of non-limiting example. The pivot is essentially directed transversally thereby allowing the upper subassembly to open relative to the lower sub-assembly by moving along a longitudinal plane LP with the head lifting in the upward curved direction B. Preferably, the upper and lower subassemblies are further pivotally mounted with elastic biasing means 30 forcing the upper sub-assembly to return automatically to the capsule handling position ("open position") of FIGS. 2 and 3 when the brewing interface head is released from the capsule receiver.

The lower sub-assembly 3 may comprise various means of a typical beverage device such as a beverage outlet 31, a cup support 32, a water tank 33 and so on. The upper sub-assembly may also comprise, for example, a user interface 34.

Figure 2:
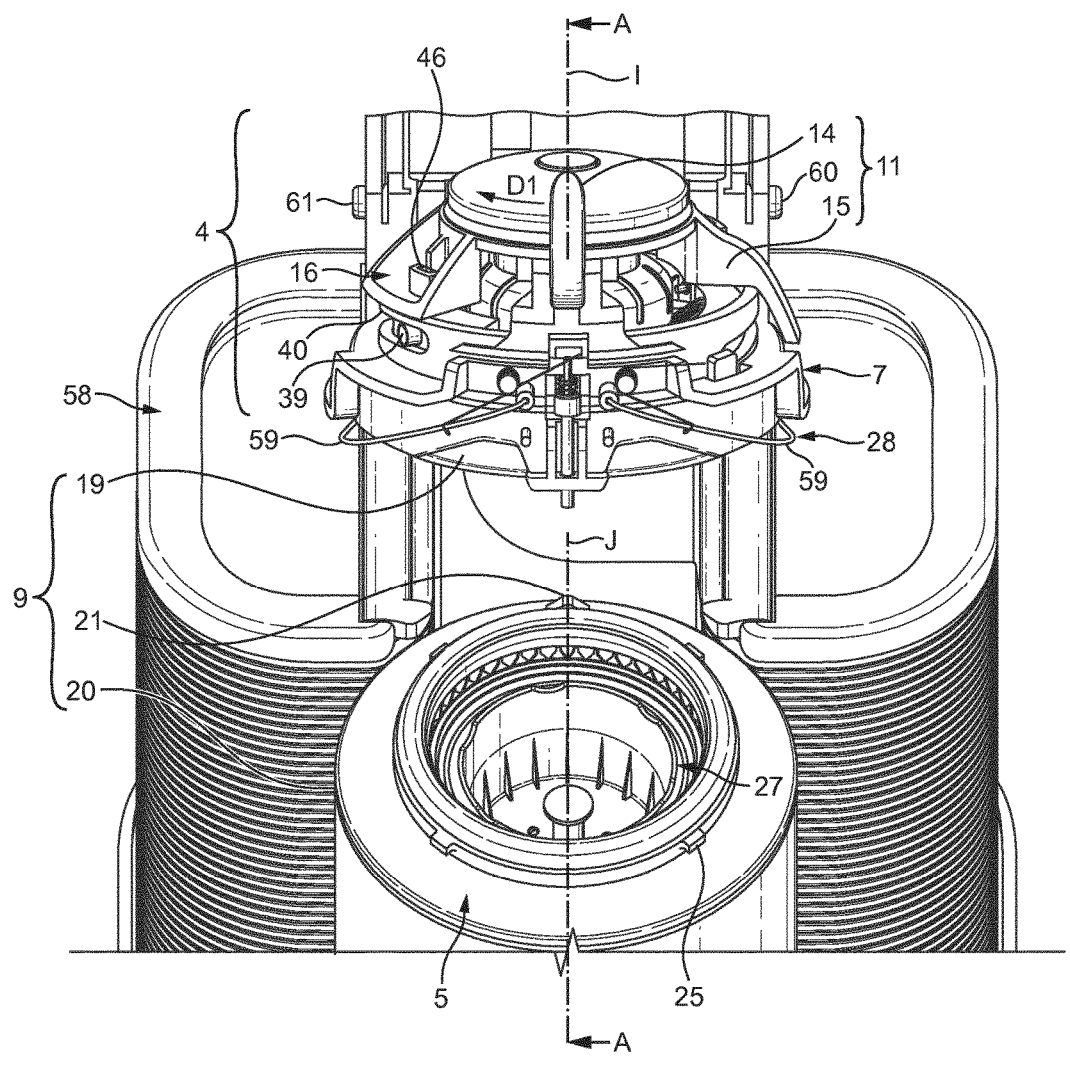
FIG. 2 shows the beverage device in frontal view when the brewing interface head is in capsule handling position (i.e., "open position") allowing the insertion of a capsule in the capsule receiver.
Figure 3:
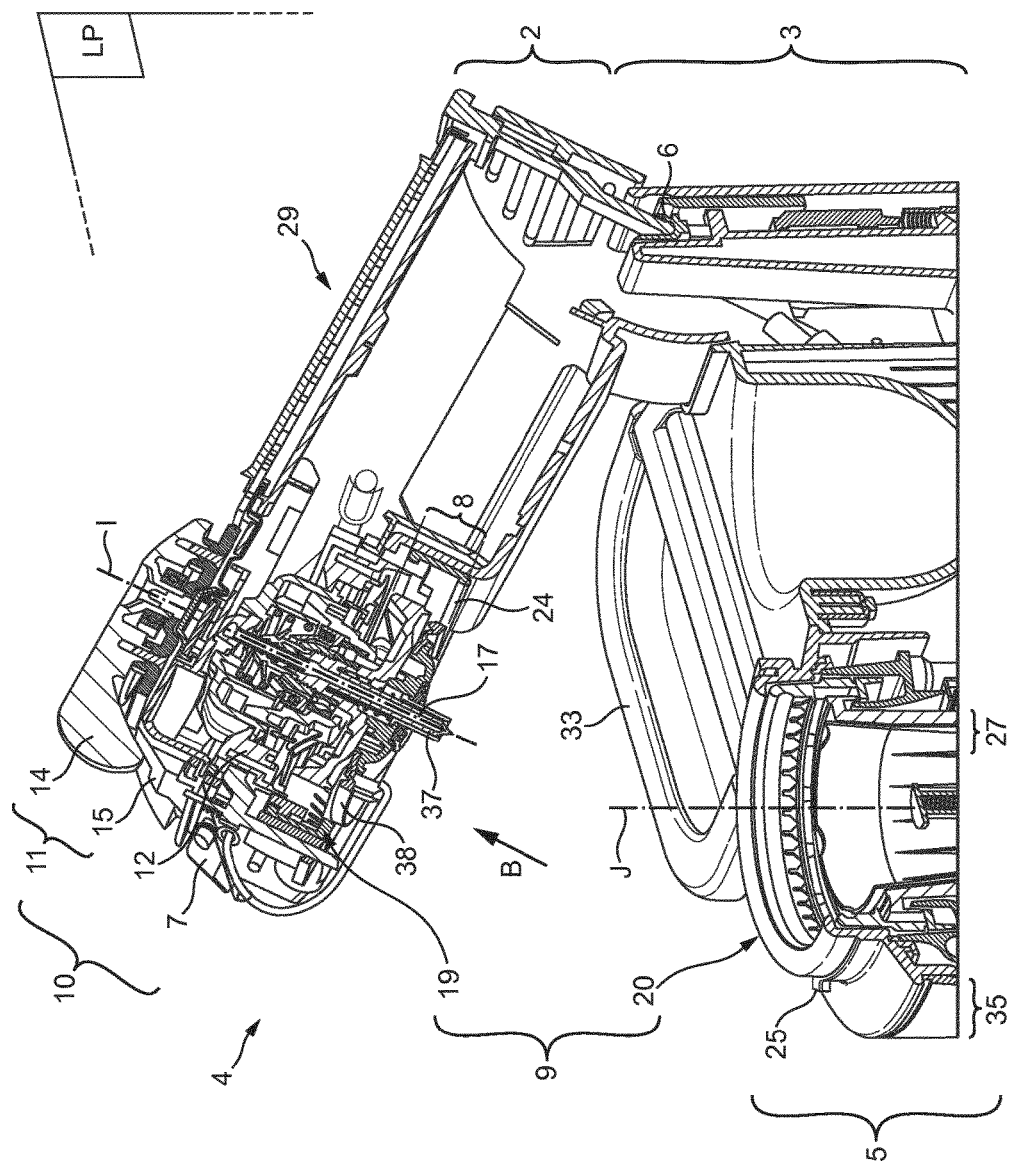
FIG. 3 shows the beverage device in perspective with a cross-sectional cut along the longitudinal plan A of FIG. 2, in the same position as in FIG. 2.
Figure 4:
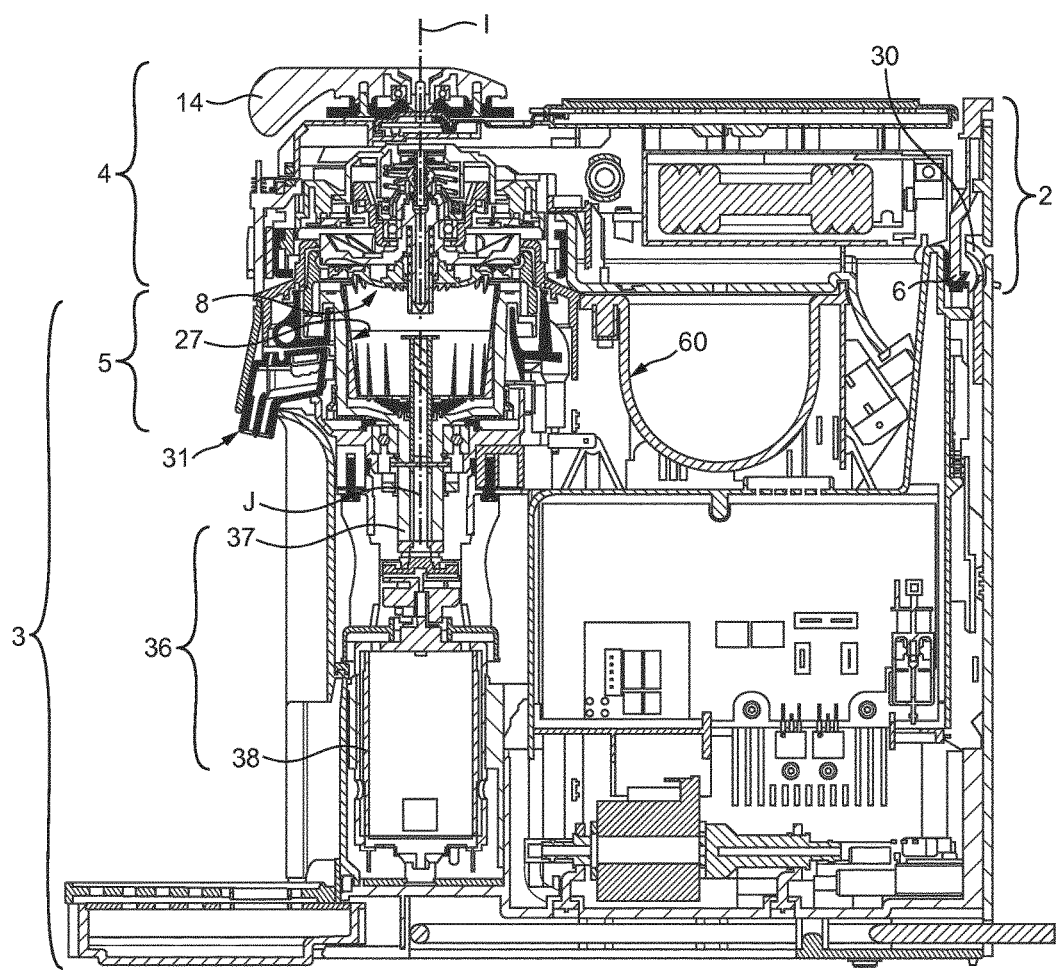
FIG. 4 is a cross-sectional cut planar view of the device in the same position as in FIG. 2.

As apparent in FIGS. 2 and 3, the capsule receiver may comprise a housing 27 for receiving the capsule. The housing is preferably mounted to the capsule receiver relative to an outer casing 35 in rotational manner along a central axis J. As illustrated in FIG. 4, the housing 27 is connected to rotational driving means 36 enabling to drive the housing 27, and so the capsule too, at a high rotational speed for the beverage extraction. In particular, the rotational driving means 36 comprises a central shaft 37, aligned along the axis J, associated to a rotary motor 38 such as an electric DC motor.

The brewing interface head comprises a brewing interface member 8 as shown in FIG. 3. The brewing interface member 8 is intended to engage with the top wall of the capsule when a capsule is inserted in the housing of the capsule receiver. The brewing interface member 8 can comprise a central liquid inlet or injector 17 for feeding an extraction liquid, more preferably hot water, in the capsule. Preferably, the liquid inlet 17 is formed in a perforating member 37 such as a hollow needle. The interface member 8 has a shape of a disc with a resilient or spring-biased border 38 which can apply pressure on the peripheral edge of the capsule, such as described in WO2011092301.

The brewing interface member 8 further comprises a plurality of perforating members 18 intended for perforating beverage outlets through the top wall of the capsule as the brewing interface member 8 is moved to the engaging-to-capsule position. The perforating members 18 are preferably positioned at the periphery of the disc shaped member 8 and protrude downwardly in order to perforate outlets in a plurality of peripheral areas of a top wall of the capsule. The position of the perforating members enables to promote the extraction of the beverage by centrifugation of the capsule in the device. Again, WO2011092301 provides a non-limiting description of the manner the beverage outlets can be provided in the capsule for extraction of the beverage through the capsule.

Figure 8:
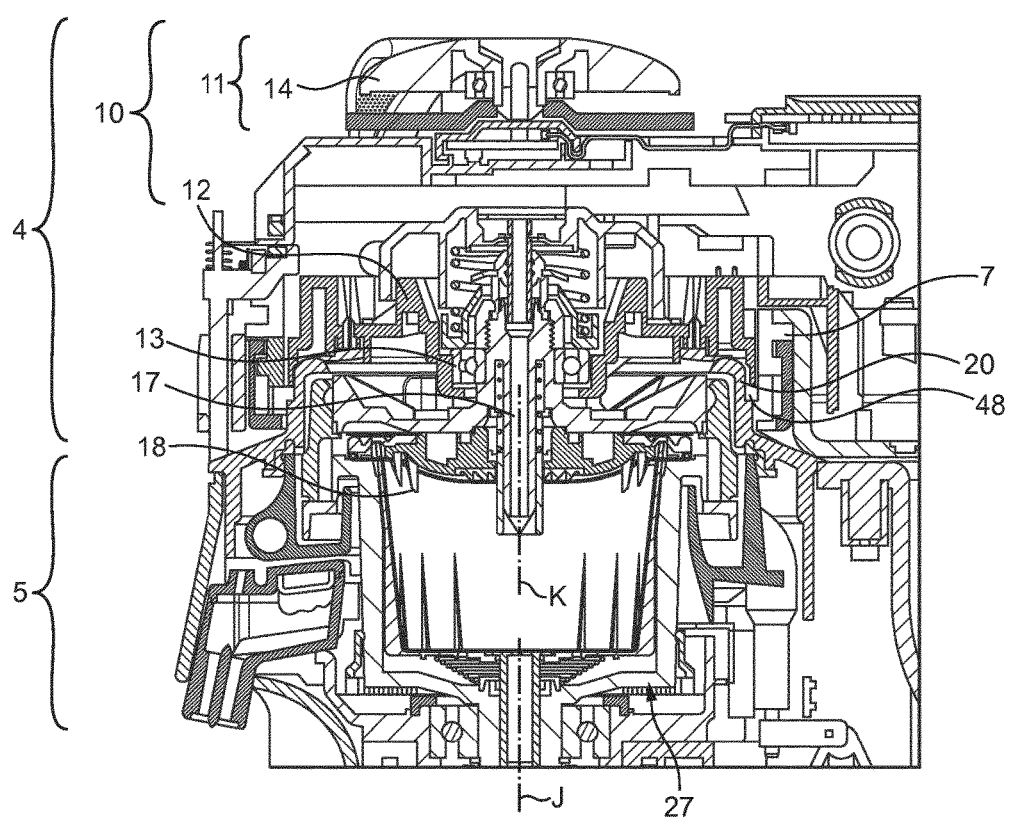
FIG. 8 is a cross-sectional cut planar view of the device when the device is in closure head position and the brewing interface member is in engaging-to-capsule position; thereby placing the device in operational and rotational axis-alignment position for beverage extraction.

The brewing interface member 8 is preferably mounted in free rotation in the brewing interface head 4 around axis I when the brewing head is in the capsule handling position. In the engaging-to-capsule position, the brewing interface member is forced to move transversally to an axis K in a manner to become substantially aligned with the central axis J of the housing when a capsule is present as will explained later in detail (FIG. 8). For this, the brewing interface head comprises a frame 7 which is fixed in the upper subassembly such as in association with an outer casing. The brewing interface member 8 is arranged to be axially movable relative to the frame 7 between the disengaging-to-capsule position of FIG. 4 and the engaging-to-capsule position of FIG. 8. The device further comprises displacement means 10 in the brewing interface head for moving the brewing interface member between the two positions. The way the brewing interface member is arranged and moved by the displacement means 10 in the brewing interface head will be later described in detail.

The device further comprises latch means 9, associated to the brewing interface head 4 and the capsule receiver 5 (FIG. 3). The latch means are arranged for latching the brewing interface head 4 to the capsule receiver 5 in the closure head position illustrated in FIGS. 1, 4 and 5.

The latch means 9 and displacement means 10 are thereby arranged to enable the brewing interface head 4 to be latched to the receiver 5 in the closure head position (FIG. 4) while the brewing interface member 8 is arranged in the disengaging-to-capsule position and to enable the displacement means 10 to move the brewing interface member 8 from the disengaging-to-capsule position to the engaging-to-capsule position when the brewing interface head is latched in the closure head position with the capsule receiver.

The device of the invention works according to a two-stage closure principle in which the brewing interface head can be secured to the capsule receiver in a first stage and then, the brewing interface member 8 can be lowered to engage against the capsule and housing 27 in a second stage. The engaging-to-capsule position resulting from this second stage is illustrated in FIG. 8.

The latch means 9 are arranged for latching the brewing head onto the capsule receiver in the closure head position by a manual force applied onto the upper sub-assembly 12 against the lower sub-assembly 3 without requiring an actuation member. Indeed, owing to the upper sub-assembly mounted in pivot about pivot axle(s) 6, the brewing interface head can be approached towards the capsule receiver simply by pushing the head down until the latch means 9 operates in closure of the head against the capsule receiver.

Figure 7:
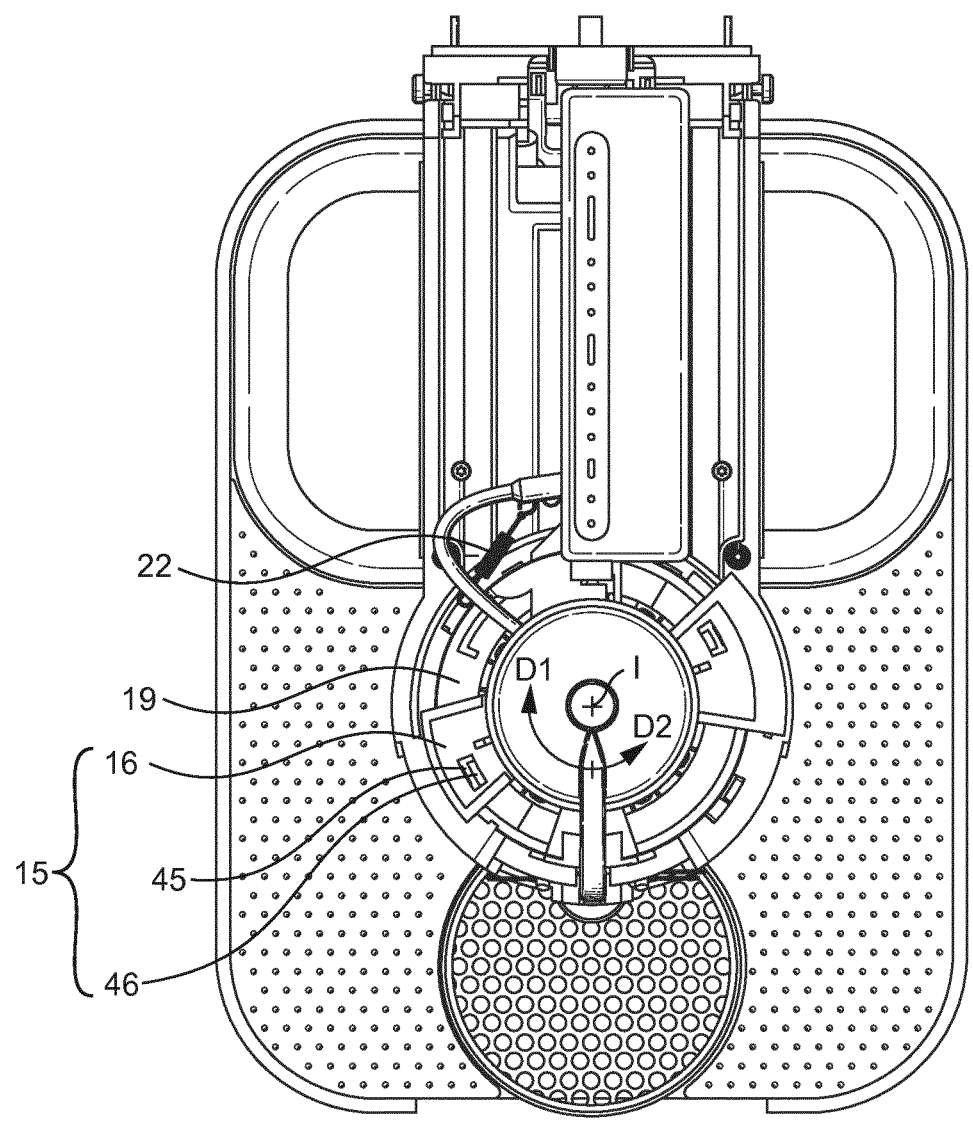
FIG. 7 is a top view of the device when the device is in closure head position and the handle is in neutral position corresponding to the disengaging-to-capsule position of the brewing interface member in the head (same as in FIG. 1)
Figure 10:
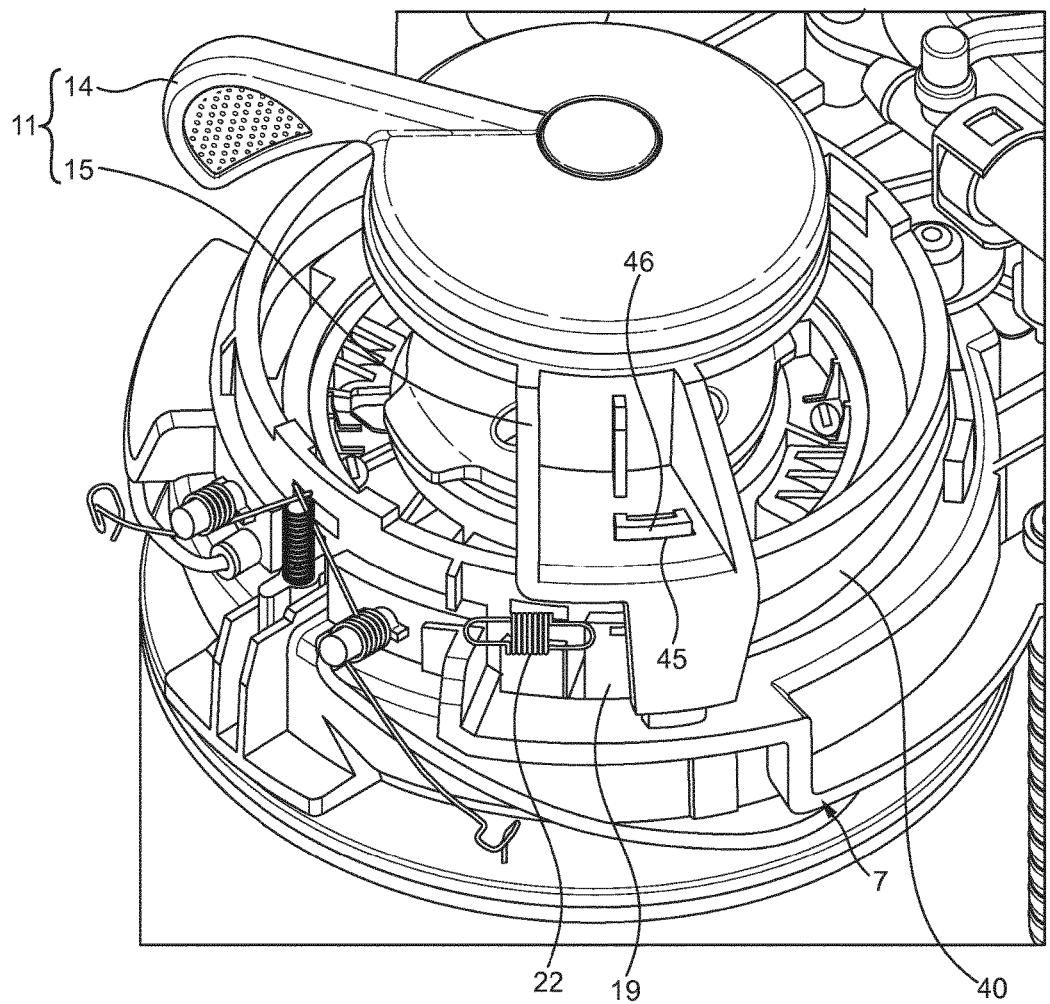
FIG. 10 is a perspective view of the device when the handle is actuated to lower the brewing interface member to the engaging-to-capsule position.

For this, the latch means 9 comprises, firstly, on the brewing interface head, a first tubular member 19, hereafter called "tubular locking member" which is arranged in the brewing interface head and secondly, on the capsule receiver, a complementary second tubular member 20. As shown in FIG. 2, the tubular locking member 19 is mounted inside the frame 7 in rotational arrangement around the central axis I of the brewing interface head. As shown in FIGS. 7 and 10, the tubular locking member 19 can be driven in rotation against the force of resilient means 22 such as one or more (e.g., traction) springs. The spring(s) is (are)

connected at one of its end to the tubular member and at its other end to the frame of the upper sub-assembly. The tubular locking member 19 and second tubular member 20 are connectable as a manner of a bayonet closure system. The tubular locking member comprises a series of recesses 23 (FIG. 6) and a series of inwardly oriented protruding portions 24 between the recesses. The recesses mate in rotational fashion with complementary tabs 25, oriented outwardly, on the second tubular member 20 of the capsule receiver. The connection is obtained by the tabs 25 being positioned inwards the inwardly protruding portions of the tubular locking member.

The latch means 9 further comprises a cam portion 21 (visible in FIG. 2) on top of the capsule receiver to engage with a recess 37 of the tubular member. The cam portion is arranged for forcing the tubular locking member 19 to engage in rotation against the force of the spring 22 until the tabs 25 of the second tubular member 20 engage with the recesses 24 of the tubular locking member. After engagement of the first and second tubular members, the tubular locking member 19 is urged in the return position by effect of the spring 22. Such configuration provides a reliable locking of the brewing head on the capsule receiver referred as the "closure head position" of FIG. 1, 4 or 7.

Back to the brewing head, the brewing interface member 8 is mounted in the frame of the brewing interface head 4 to be moved from its disengaging-to-capsule position to its engaging-to-capsule position in an essentially linear axial direction relative to the capsule receiver. More preferably, the brewing interface member 8 is further mounted in the frame 7 to be moved linearly between the two positions without forced rotation about the axial direction I. As a result, the brewing interface member can engage with the capsule without misalignment and without significant stress on the capsule that could damage it.

Figure 5:
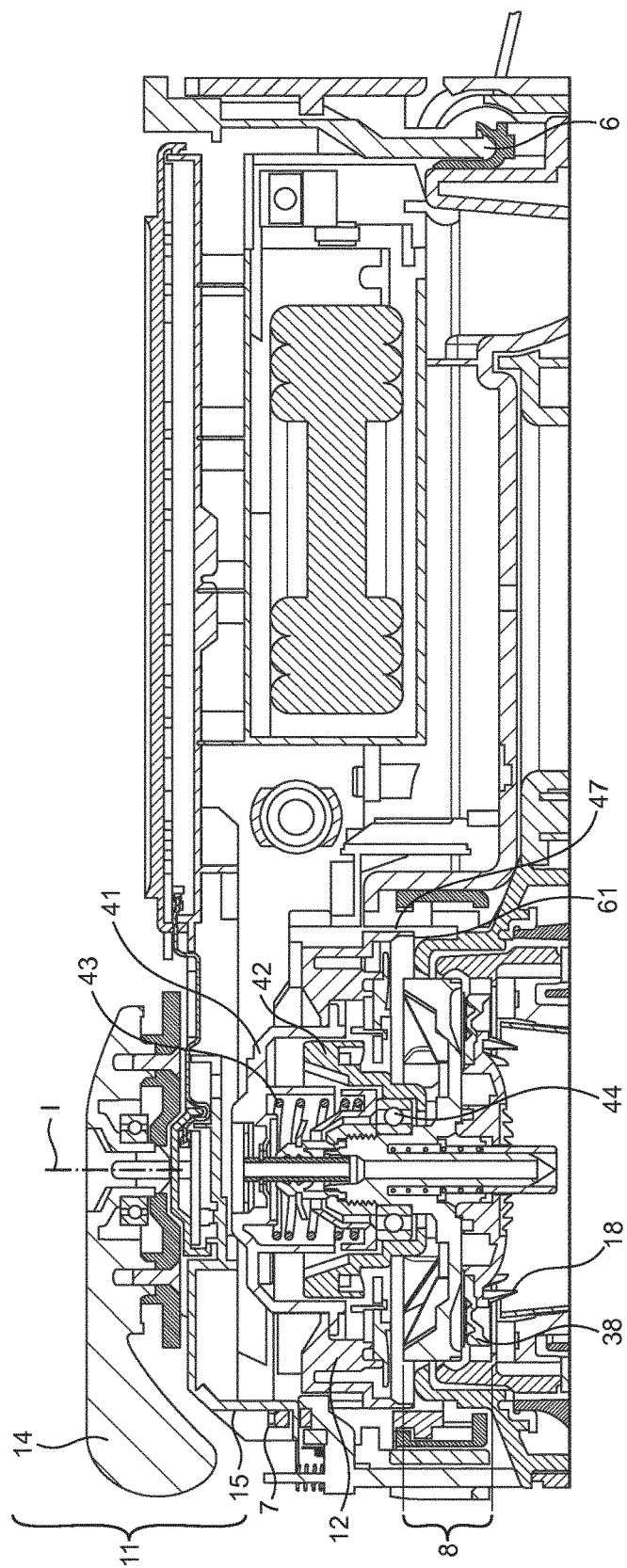
FIG. 5 is an enlarged cross-sectional view of FIG. 4 showing the brewing interface head.
Figure 6:
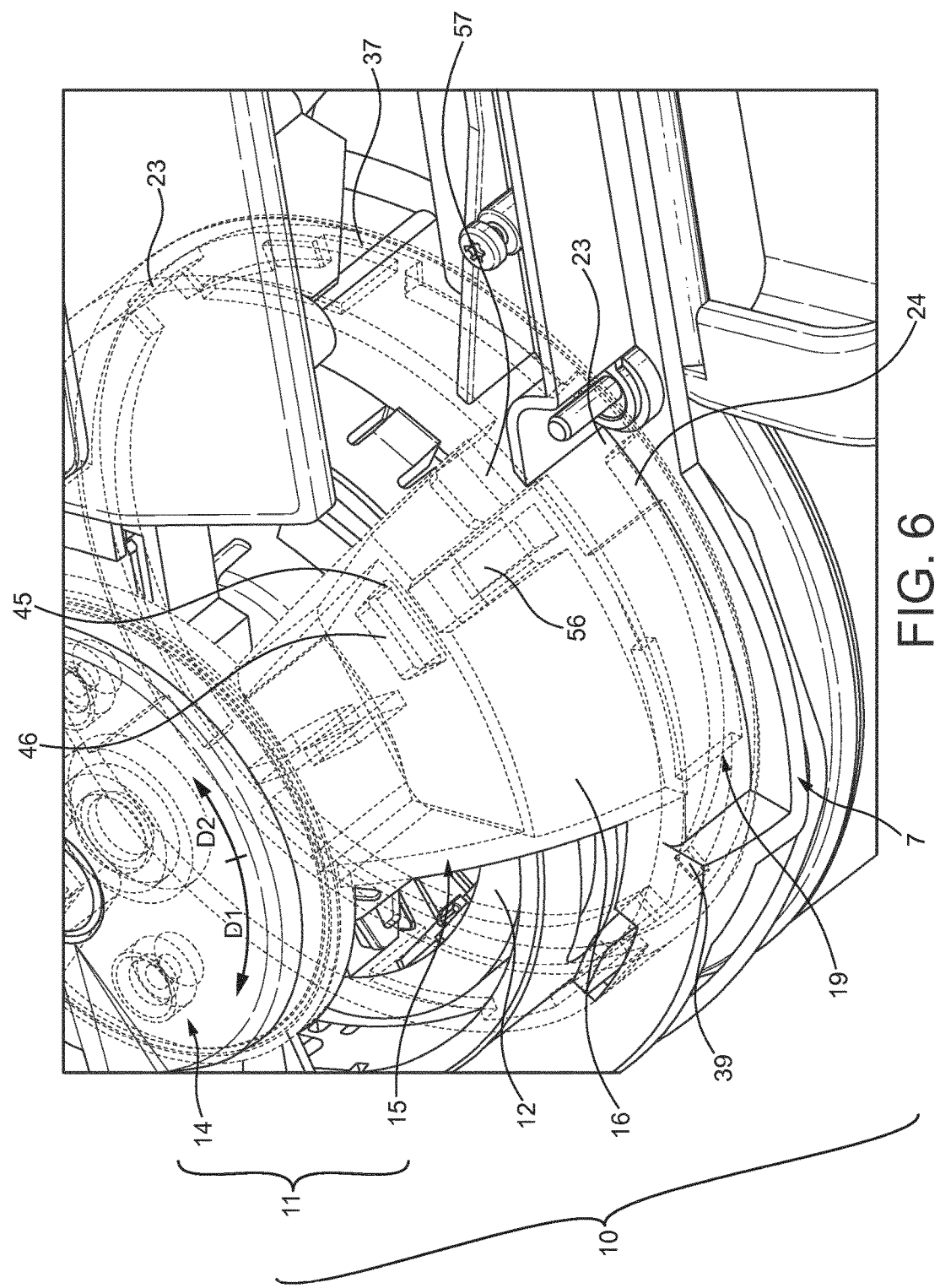
FIG. 6 is a detail of the brewing interface head of FIG. 5.

For displacing the brewing interface member, the displacement means 10 comprises a rotating lever system 11 illustrated in FIGS. 2, 5 and 6, for example. The rotating lever system 11 acts a force transfer member 12 which is helically guided in the frame 7 of the head. More particularly, the force transfer member 12 has the general form of a disc with lateral protruding pins 39 that engage into a pair of helical paths 40 of the tubular frame 7. The force transfer member 12 is arranged to transfer the rotational torque of the lever system 11 into an axial force pressing onto the brewing interface member 8.

Preferably, as shown in FIG. 5, the force transfer member 12 is arranged to push the brewing interface member 8 down in the engaging-to-capsule position when the head is closed. For this, the force transfer member 12 is connected to an upper ring assembly 41 mounted in relation to a lower ring assembly 42 via a central force spring 43. The upper ring assembly is pushed linearly by the transfer member 12, which itself compresses the force spring 43, which itself pushes the lower ring assembly 42 linearly down towards the brewing interface member 8. The lower ring assembly is connected to the brewing interface via a free rotational arrangement such as a ball bearing 44. As will further explained, the force transfer member 12 is mounted in the frame with a controlled transversal play for allowing it to adjust itself to the capsule receiver in axis alignment when the brewing interface member 8 is displaced axially into the engaging-to-capsule position. As a result of such position adjustment during such engagement, the force transfer member drives the brewing interface member 8 transversally via the whole mechanical chain composed by the upper ring assembly 41, the force spring 43 and lower ring assembly 42. As a result, a correct alignment of the brewing interface member 8 is ensured with the capsule receiver.

The rotating lever system further comprises a manual pivotable handle 14 rotationally positioned on the top of the brewing interface head 4 preferably along the axis I, corresponding to the axis of the central axis of the rotational brewing interface member when the brewing head is in the capsule handling position (FIG. 3). The axis I is preferably vertical or close to vertical when the brewing interface head is in closed position (FIG. 5).

Figure 9:
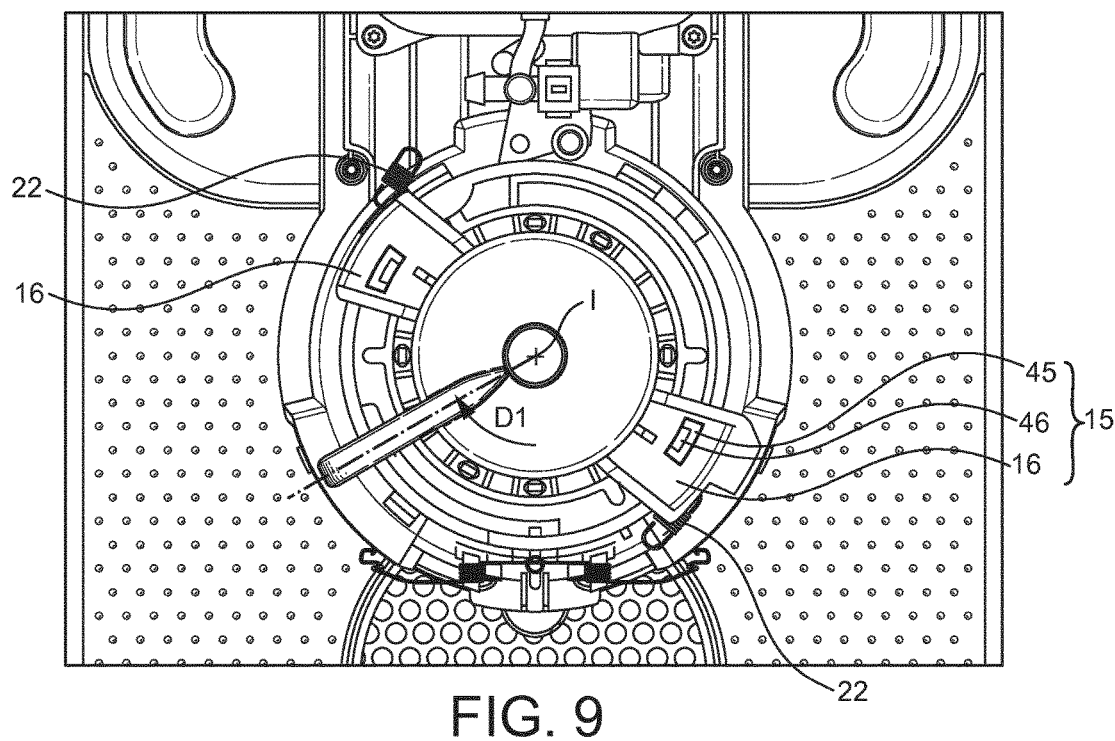
FIG. 9 is a top view of the device when the handle is actuated to lower the brewing interface member to the engaging-to-capsule position.

The rotating lever 11 system further comprises a torque transmitter 15 axially and rotationally mounted between the pivotable handle 14 and the helically guided force transfer member 12. The torque transmitter 15 is fixedly connected to the handle 14 such as via rivets and/or screws. The torque transmitter 15 and handle 14 could also be formed of a single piece such as in injected plastic. The torque transmitter 15 comprises a pair of opposed engagement wings 16 positioned at a off-centred distance from the rotational axis I of the transmitter for driving the force transfer member 12 along its helical guiding path as a result of a determined rotational magnitude of the handle 14. As illustrated in FIGS. 2, 6 and 7, the wings 16 comprises a slot 45 which an upwardly oriented tongue 46 of the force transfer member 12 engages through. The same wing 16 is present on the opposite side of the system relative to axis I. When the handle is operated in direction D1, i.e., in clockwise direction, along an angular distance of about 80 degrees, as shown in FIG. 9, the torque transmitter 15 is also moved on the same direction of the same angular distance. The torque transmitter 15 drives the force transfer member 12 in helical movement along the helical paths 40 of the frame. The torque transmitter 15 acts consequently on the brewing interface member 8 to move it down linearly, without forced rotation, towards the housing of the capsule receiver.

Such torque transmitter 15 is thus designed to increase the force submitted to the force transferring member 12 or proportionally diminish the manual force required for leveraging the handle 14 from the disengaging-to-capsule position (FIG. 5) to the engaging-to-capsule position of the interface member (FIGS. 8 and 9). Therefore, a force de-multiplication on the brewing interface member is obtained by a relatively long angular displacement of the lever system, e.g., 80 degrees, providing a short linear (non rotational) displacement, e.g., a few millimeters, of the brewing interface member 8. Such force de-multiplication is totally independent from the closure pivoting movement of the head on the capsule receiver. Therefore, the pivot axles 6 of the device are relatively freed of the closure stress created by this independent pressure closure.

A centering of the rotating parts of the brewing head relative to the capsule receiver is also obtained by providing a sufficient annular gap 47 between the force transfer member 12 and the frame 7 so that the force transfer member 12 when mating over the second tubular member in an annular recess 48 can adjust itself in proper alignment with the capsule receiver. Such gap can be relatively small such as ranging from $\frac{1}{10}$ to 2 mm in the disengaging-to-capsule position (FIG. 5). The annular recess 48 is formed between the lower second tubular member 20 and the tubular frame 7 of the head. The force transfer member comprises a tubular, preferably tapered, end 61 projecting towards the recess, which engages in the recess 48 between the second tubular member 20 and the frame 7 to ensure a self-alignment of the force transfer member and, consequently, of the brewing interface member 8, of central axis K with the axis J of the capsule receiver, and consequently, its housing 27. Therefore, the brewing interface member 8 is possibly moved transversally from axis I in the disengaging-to-capsule position to axis K in the engaging-to-capsule position by virtue of the self adjustment of the force transfer member 12 in the recess neighbouring the capsule receiver, so that the proper alignment of axis K with the axis I of the capsule receiver is ensured. As an important result, the brewing interface member 8 becomes always rotatably aligned with the capsule receiver, in particular, with the rotating housing 27 regardless of the possible slight misalignment of the frame of the brewing head with the capsule receiver, or the upper subassembly with the lower subassembly, due, for instance, to dimensional tolerance, wearing of the pivot or mobile parts or other technical reasons. It should be noted that the possible realignment of the axis I into axis K may be of relatively low magnitude such as 0.1 to 1 mm.

Figure 13:
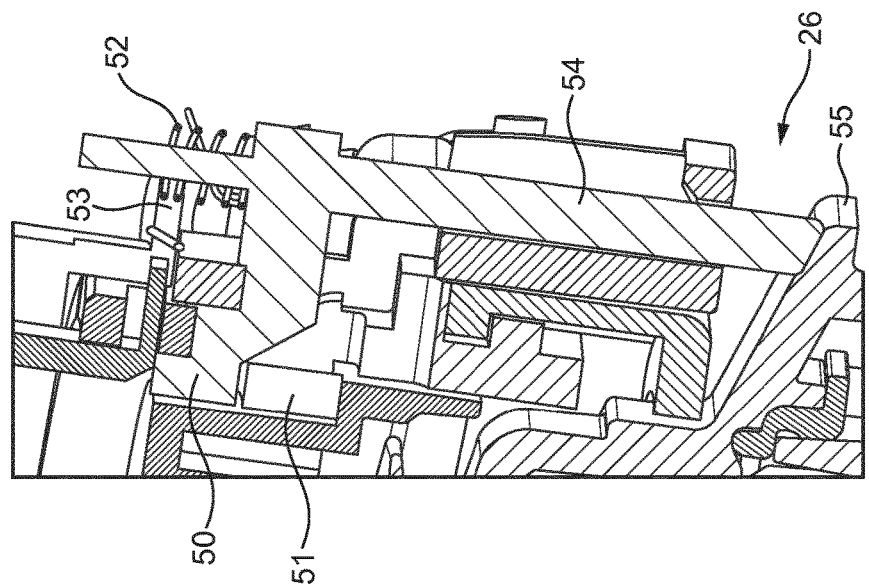
FIG. 13 shows a detail of the device, in particular, the security locking system when the brewing interface head is in closure position.
Figure 12:
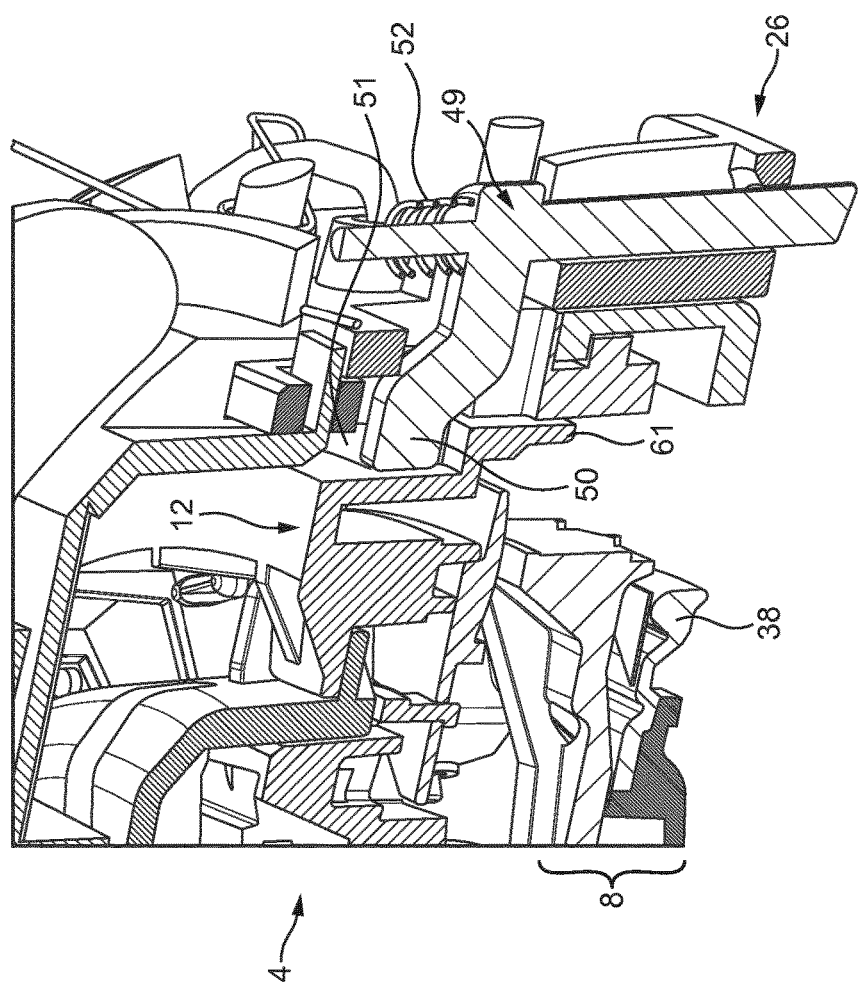
FIG. 12 shows a detail of the device, in particular, the security locking system when the brewing interface head is not yet in closure position.

As illustrated in FIGS. 12 and 13, the device further comprises a security locking system 26 for blocking the displacement means 10 as long as the brewing interface head 4 is not latched by the latch means 9 in the closure head position. The system is arranged so that this blockage makes impossible the lowering of the brewing interface member 8 in the engaging-to-capsule position. In particular, the security locking system 26 comprises an actuator 49 capable of moving between a blocking position of the force transfer member 12 (FIG. 12) and a released position of the force transfer member 12 (FIG. 13). In the blocking position, an abutment portion 50 of the actuator is arranged in engagement with a transversal portion of wall 51 of the member 12 thereby preventing it from being displaced helically. The actuator is forced by a resilient member 52 placed between the actuator and an upper abutment 53 of the frame in a low position. In the release position (FIG. 13), the actuator comprises a pin 54 which engages on the capsule receiver, for example, against a front outer wall 55. In this position, the actuator is positioned in high position by compressing the resilient means 52 against the abutment 53, thereby placing the abutment portion 50 of the actuator disengaged from the transversal portion of wall 51. This position corresponds to the closure head position in which the brewing interface head is locked to the capsule receiver by the latch means 9. In this position, the displacement means 10 become operational for moving the brewing interface member.

Figure 11:
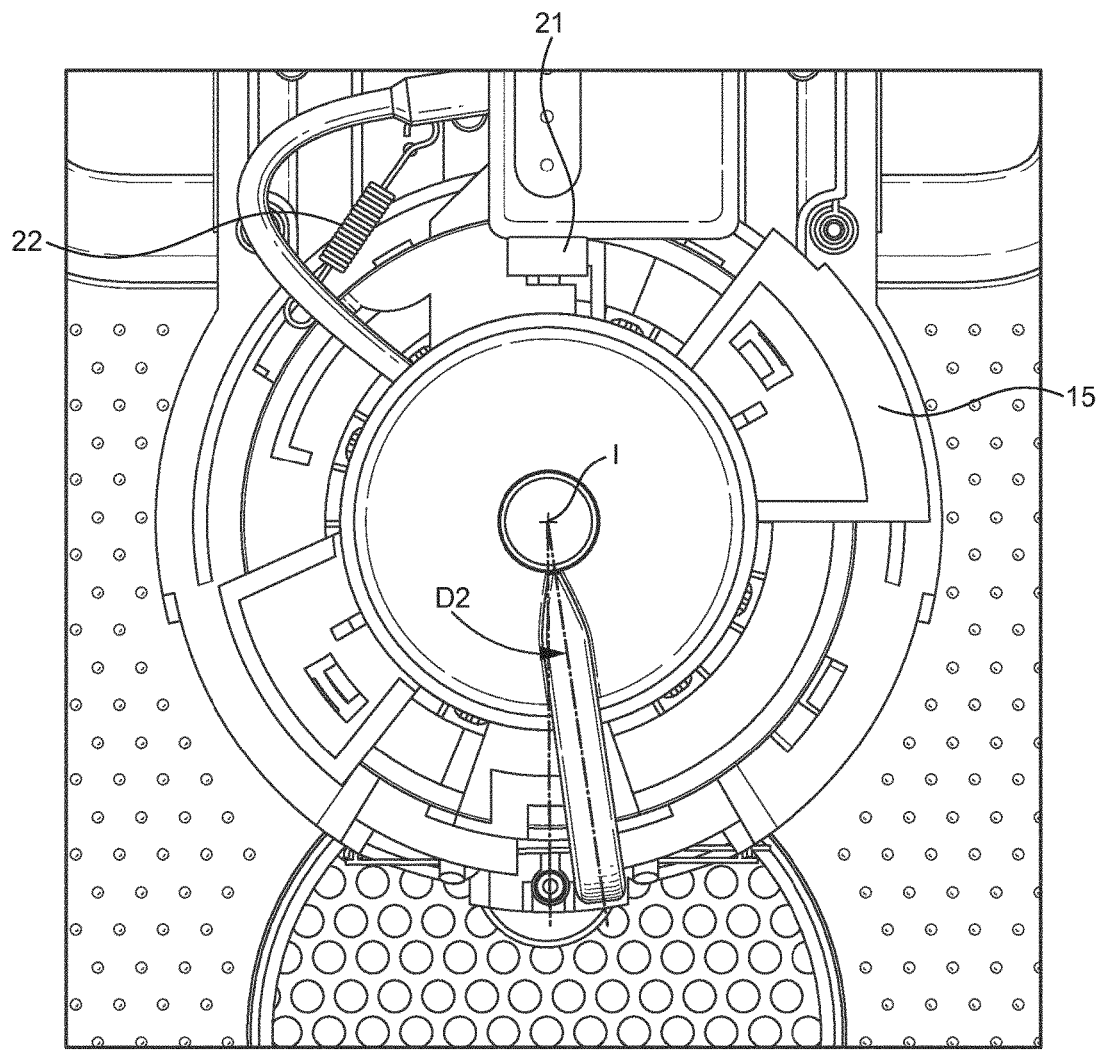
FIG. 11 is a top view of the device when the handle is actuated to open the brewing interface head; the head returning, by such an activation, to the capsule handling position.

The device of the invention further comprises a release mechanism using the rotating lever system 11 for operating the disengagement of the latch means 9. Such mechanism can be explained in relation to FIGS. 6 and 11. For this, the torque transmitter 15 comprises a pusher 56 which is adjacent to an upwardly protruding tab 57 of the tubular locking member 19. When the pivotable handle 14 is moved in direction D2, i.e., counter-clockwise, of a few degrees from the neutral position of FIG. 7, for example about 10 degrees, the torque transmitter directly acts, via the pusher 56 on the tab 47, to move the tubular locking member 19 in the same direction so that the recesses 23 become angularly aligned with the tabs 25 of the second tubular member 20. As a result of this alignment state, the upper sub-assembly 2 is automatically urged pivotally away from the lower sub-assembly 3 around the pivot axles 6 by virtue of the elastic biasing means 30. During this return of the device, to the capsule handling position, the capsule placed in the housing is generally handled by the capsule ejection means 28 and discarded in a capsule bin 58 of the device. More particularly, the ejection means comprises a pair of spring biased clamping members 59 which engages the edge of the capsule and lift it when the brewing interface head is released. The lifted capsule then slides rearwards along the clamping members 59 and falls in a chute 60 communicating with the capsule bin. The working principle of the ejection system is described in co-pending patent application WO 2012041605.

The invention claimed is:

1. A beverage device comprising:
    an upper sub-assembly comprising a brewing interface head;
    a lower sub-assembly comprising a capsule receiver for being engaged by the brewing interface head between a capsule handling position and a closure head position, the upper sub-assembly is hinged on the lower sub-assembly to be pivotally movable between the capsule handling position and the closure head position, and the brewing interface head comprises a frame and a brewing interface member, the brewing interface member arranged to be movable relative to the frame between a disengaging-to-capsule position and an engaging-to-capsule position;
    a latch member associated to the brewing interface head and the capsule receiver, the latch member is arranged for latching the brewing interface head to the capsule receiver in the closure head position;
    a displacement member of the brewing interface head configured for moving the brewing interface member between the disengaging-to-capsule position and the engaging-to-capsule position, and the latch member and the displacement member are arranged to enable the brewing interface head to be latched to the capsule receiver in the closure head position while the brewing interface member is arranged in the disengaging-to-capsule position and to enable the displacement member to move the brewing interface member from the disengaging-to-capsule position to the engaging-to-capsule position when the brewing interface head is latched in the closure head position; and
    a security locking system for blocking the displacement member as long as the brewing interface head is not latched by the latch member in the closure head position.

2. The beverage device according to claim 1, wherein the brewing interface member is mounted in the frame of the brewing interface head to be moved from the disengaging-to-capsule position to the engaging-to-capsule position in an essentially linear axial direction relative to the capsule receiver.

3. The beverage device according to claim 2, wherein the brewing interface member is further mounted in the frame to be moved, between the disengaging-to-capsule position and the engaging-to-capsule position, linearly without forced rotation about the essentially linear axial direction.

4. The beverage device according to claim 2, wherein the displacement member comprises a rotating lever system acting on a force transfer member helically guided in the frame, the force transfer member transferring a rotational torque of the rotating lever system into a linear force acting onto the brewing interface member to force the brewing interface member in the engaging-to-capsule position.

5. The beverage device according to claim 4, wherein the rotating lever system comprises a manual pivotable handle rotationally positioned on a top of the brewing interface head along an axis substantially aligned with a central axis of the capsule receiver in the closure head position.

6. The beverage device according to claim 5, wherein the rotating lever system comprises a torque transmitter axially and rotationally mounted between the manual pivotable handle and the force transfer member, the torque transmitter comprising at least one engagement wing positioned at a distance from a rotational axis of the torque transmitter for driving the force transfer member along a helical guiding path as a result of a determined rotational magnitude of the manual pivotable handle.

7. The beverage device according to claim 1, wherein the brewing interface member comprises a central liquid inlet and a plurality of perforating members for perforating beverage outlets through a capsule as the brewing interface member is moved to the engaging-to-capsule position.

8. The beverage device according to claim 1, wherein the latch member is arranged for latching the brewing interface head onto the capsule receiver in the closure head position by a manual force applied onto the upper sub-assembly against the lower sub-assembly without requiring an actuation member.

9. The beverage device according to claim 8, wherein the latch member is a bayonet-type member comprising, on the brewing interface head, a first tubular member arranged in the brewing interface head to latch with a complementary second tubular member of the capsule receiver, the first tubular member urged by a cam portion of the capsule receiver in the closure head position under a force of a resilient biasing member.

10. The beverage device according to claim 8, wherein the latch member is arranged to release the brewing interface member from the closure head position to return to the capsule handling position by a lever system which is common to the displacement member.

11. The beverage device according to claim 10, wherein the lever system comprises a pivotable handle axially positioned on a top of the brewing interface head.

12. The beverage device according to claim 11, wherein the lever system is arranged to configure the pivotable handle to act on the displacement member from a neutral position to a first angular position and, to act on the latch member to release the brewing interface head which returns in the capsule handling position, from the neutral position to a second angular position of the pivotable handle.

13. The beverage device according to claim 12, wherein the first angular position and the second angular position are located along opposed rotational directions relative to the neutral position.

14. The beverage device according to claim 1, wherein the displacement member comprises a rotating lever system acting on a force transfer member helically guided in the frame, the force transfer member transferring a rotational torque of the rotating lever system into a linear force acting onto the brewing interface member to force the brewing interface member in the engaging-to-capsule position.

15. The beverage device according to claim 1, wherein the brewing interface member comprises a central liquid inlet and a plurality of perforating members for perforating beverage outlets through a capsule as the brewing interface member is moved to the engaging-to-capsule position.

16. A beverage device comprising:
an upper sub-assembly comprising a brewing interface head;
a lower sub-assembly comprising a capsule receiver for being engaged by the brewing interface head between a capsule handling position and a closure head position, the upper sub-assembly is hinged on the lower sub-assembly to be pivotally movable between the capsule handling position and the closure head position, and the brewing interface head comprises a frame and a brewing interface member, the brewing interface member arranged to be movable relative to the frame between a disengaging-to-capsule position and an engaging-to-capsule position;
a latch member associated to the brewing interface head and the capsule receiver, the latch member is arranged for latching the brewing interface head to the capsule receiver in the closure head position;
a displacement member of the brewing interface head configured for moving the brewing interface member between the disengaging-to-capsule position and the engaging-to-capsule position, and the latch member and the displacement member are arranged to enable the brewing interface head to be latched to the capsule receiver in the closure head position while the brewing interface member is arranged in the disengaging-to-capsule position and to enable the displacement member to move the brewing interface member from the disengaging-to-capsule position to the engaging-to-capsule position when the brewing interface head is latched in the closure head position; and
a housing for holding a capsule, the housing is arranged in the capsule receiver to be rotationally driven along a central axis, and the brewing interface member is mounted in free rotation in the brewing interface head in a manner to become aligned with the central axis of the housing in the engaging-to-capsule position of the brewing interface member onto the housing.

17. The beverage device according to claim 16, wherein the displacement member is arranged relative to the capsule receiver to force the brewing interface member, moving from the disengaging-to-capsule position to the engaging-to-capsule position, to move transversally to a rotational axis of the brewing interface member which is aligned with the central axis of the housing.

* * * * *